Dec. 14, 1926. 1,610,693
M. J. LYONS
WINDSHIELD AND VENTILATOR MOUNTING FOR AUTOMOBILES
Filed Sept. 1, 1925  2 Sheets-Sheet 2
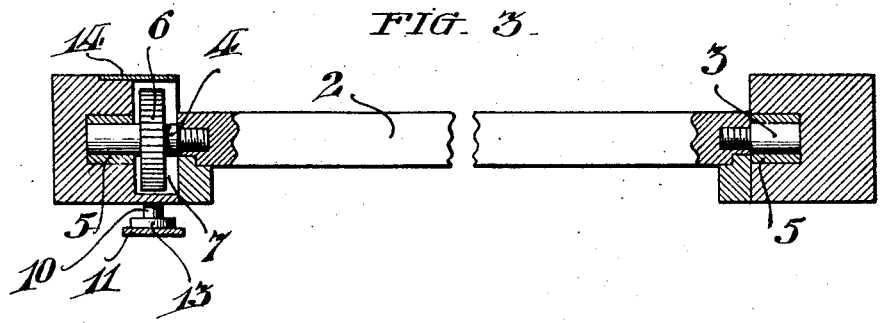
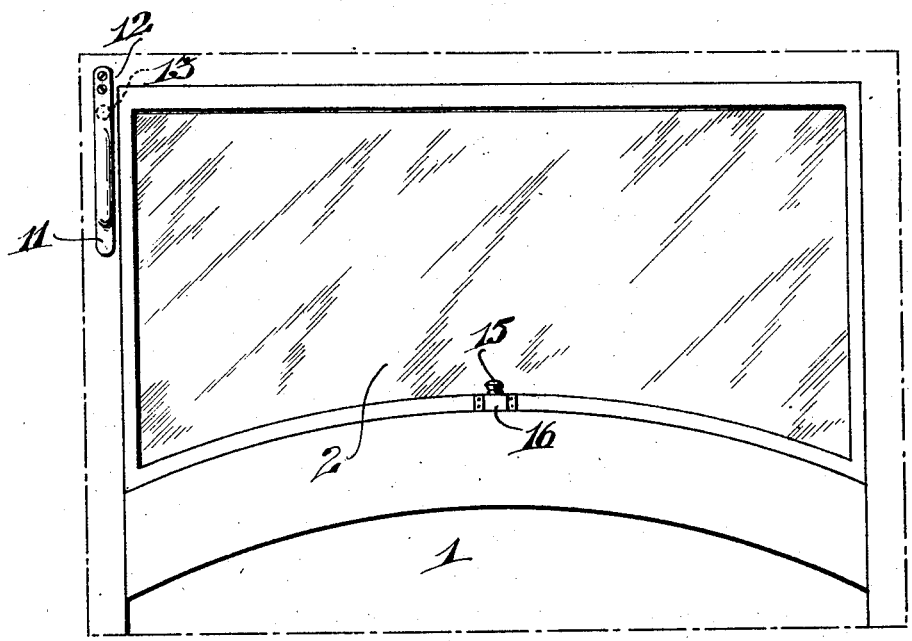
WITNESSES:
Alfred E. Dschinger
George A. Gruss
INVENTOR
Michael J. Lyons,
BY
Joshua R. H. Potts
ATTORNEY.

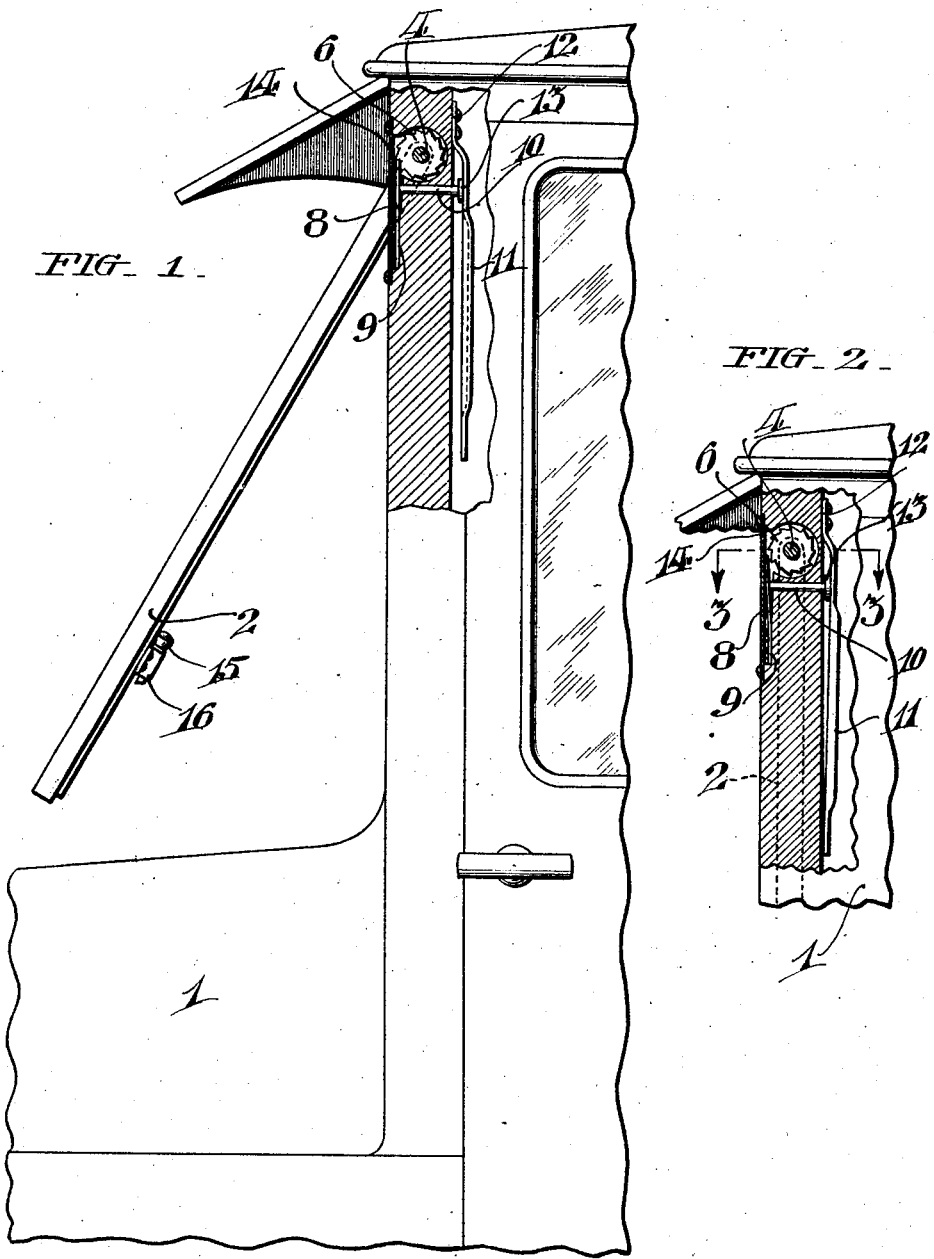

Patented Dec. 14, 1926.

1,610,693

UNITED STATES PATENT OFFICE.

MICHAEL J. LYONS, OF PINE BEACH, NEW JERSEY.

WINDSHIELD AND VENTILATOR MOUNTING FOR AUTOMOBILES.

Application filed September 1, 1925. Serial No. 53,803.

My invention relates to windshields and ventilators for automobiles, and more particularly to the mounting therefor.

The objects are to provide a mounting whereby a windshield or ventilator of the transom type may be swung open to any position by a slight push of the hand, and positively held in that position, and which will allow it to swing to closed position by merely pushing a button or lever, thereby eliminating the difficulty, inherent in prior windshield mountings, especially while driving the automobile, of loosening and tightening set screws with one hand while holding the windshield in open position with the other.

These objects, and other advantageous ends which will be described hereinafter, I attain in the following manner, reference being had to the accompanying drawings in which—

Figure 1 is a fragmentary side elevation partly in section and broken away of an automobile body having my invention applied thereto showing the shield in open position, Figure 2 a like view showing the windshield in closed position, Figure 3 a fragmentary section on line 3—3 of Figure 2, and Figure 4 a rear elevation of the windshield looking from the inside of the body.

I have illustrated my invention as applied to the front of an automobile, but it is equally applicable to any window of the transom type where it is desirable to shield the occupants and provide for ventilation.

Referring to the drawings, 1 indicates a body of an automobile, 2 a windshield, 3 and 4 pivot studs threaded to the edges of the windshield and rockably mounted in bearings 5 on the body, and 6 a ratchet wheel fixed to pivot stud 4 and disposed in a cavity 7 in the body. A detent 8, preferably of strip spring metal, has one end secured to the body at 9 and the other end engaging the ratchet wheel to hold the shield in open position. A push pin 10 slidably mounted in the body, has one end abutting strip 8 and its other end abutting lever 11 secured to the body at 12. The lever may be either of the pivotal or spring type, preferably the latter as shown in the drawings. When windshield 2 is small and light, lever 11 may be omitted and a head 13 may be provided on push pin 10 for pressing the pin against the strip to disconnect it from the ratchet wheel and allow the shield to swing to closed position. The opening through which access may be had to cavity 7 may be closed by a cover plate 14.

For holding the shield in closed position I provide a spring-lock 15 having a knob 16 which may serve as a handle for moving the shield in either direction.

A shield so mounted may be released from its closed position and swung to any open position by merely lifting the latch by means of the knob and then exerting a slight pressure upon the knob. During the swinging movement of the shield, the teeth of the ratchet wheel will pass the end of the detent and when the shield is in the proper position, the detent will engage the last tooth which passes and hold the shield in that position.

To close the shield, it is merely necessary to press the lower end of the spring lever 11 to cause a disconnection of detent 8 from ratchet wheel 6. When lever 11 is omitted, the head 13 is pressed to cause this disconnection. After the disconnection is made, the shield will swing to its closed position by its own weight and pressure of the air if the automobile is moving.

The mounting above described may be applied to any windshield of the pivotal type and provides a positive stop for preventing the windshield from being forced to the closed position by the air pressure when the vehicle is moving. The mounting is practically unnoticeable and does not impair the neat appearance of a vehicle body.

While I have illustrated my mechanism as applied to the front of an automobile, it is obvious that it may be advantageously applied to any hinged window in the side or rear of the car where it may be desired to shield the occupants from the elements and still maintain ventilation.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claims.

Having thus described my invention, what

I claim as new and desire to secure by Letters Patent is:—

1. In combination with a vehicle body having a windshield; pivot studs secured to the shield and bearing in the body; a ratchet secured to one of the studs; a spring strip secured to the body and engaging the ratchet wheel to hold the shield in open position, and a push rod slidable in the body for disconnecting the strip from the ratchet wheel to allow the shield to swing to closed position.

2. In combination with a vehicle body having a windshield; pivot studs secured to the shield and bearing in the body; a ratchet wheel secured to one of the studs; a spring strip secured to the body and engaging the ratchet wheel to hold the shield in open position; a lever mounted on the body, and means connected with the lever for disconnecting the strip from the ratchet wheel to allow the shield to swing to closed position.

3. In combination with a vehicle body having a windshield; pivot studs secured to the shield and bearing in the body; a ratchet wheel secured to one of the studs; a spring strip secured to the body and engaging the ratchet wheel to hold the shield in open position; a spring lever secured to the body, and a slidable member in the body between the lever and the strip for disconnecting it from the ratchet wheel to allow the windshield to swing to closed position.

In testimony whereof I have signed my name to this specification.

MICHAEL J. LYONS.